May 6, 1930.  J. L. COLLINS  1,757,414
POWER TRANSMISSION GEARING
Filed June 11, 1928    4 Sheets-Sheet 3
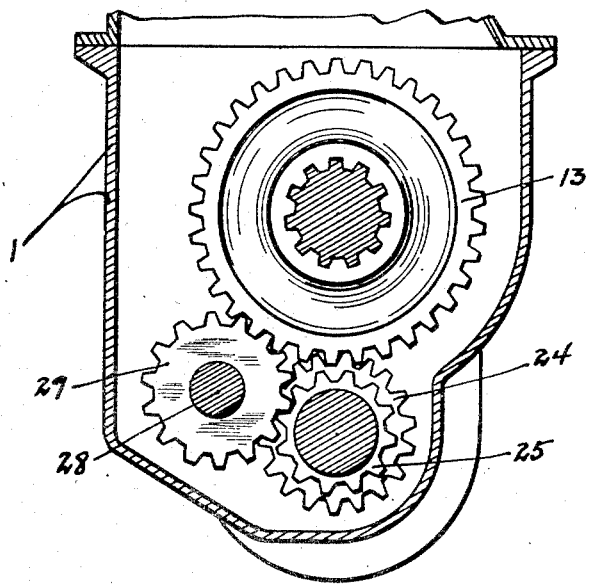
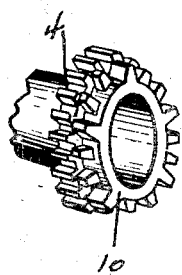
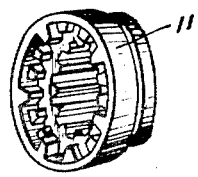

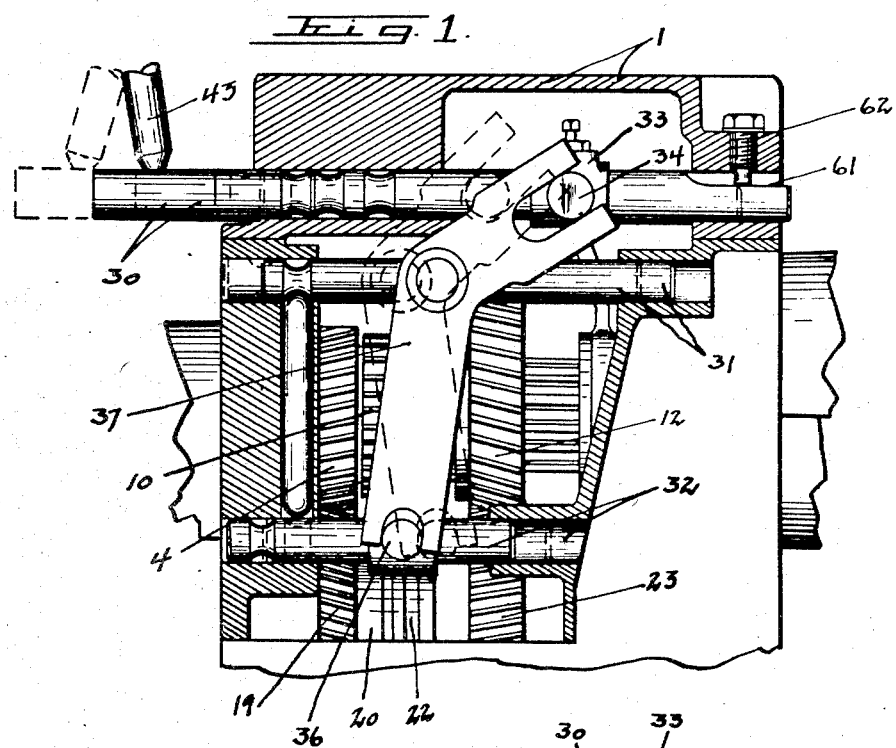
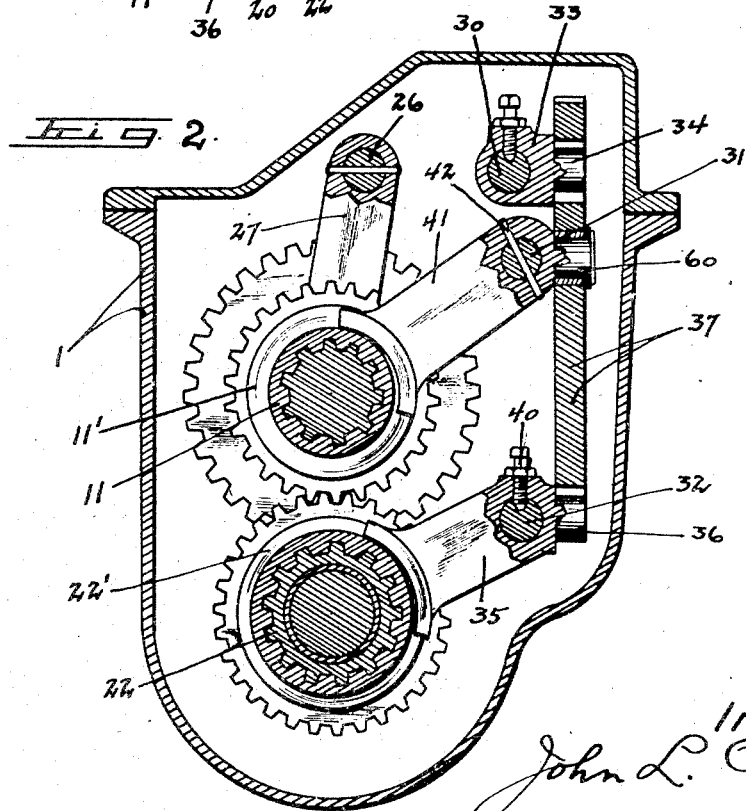

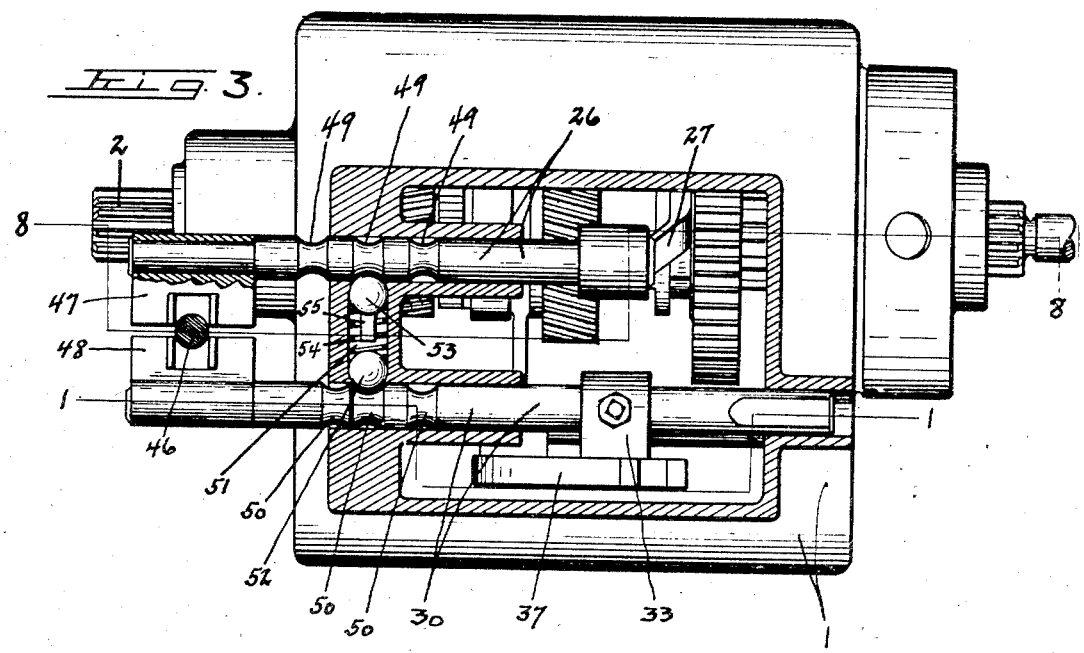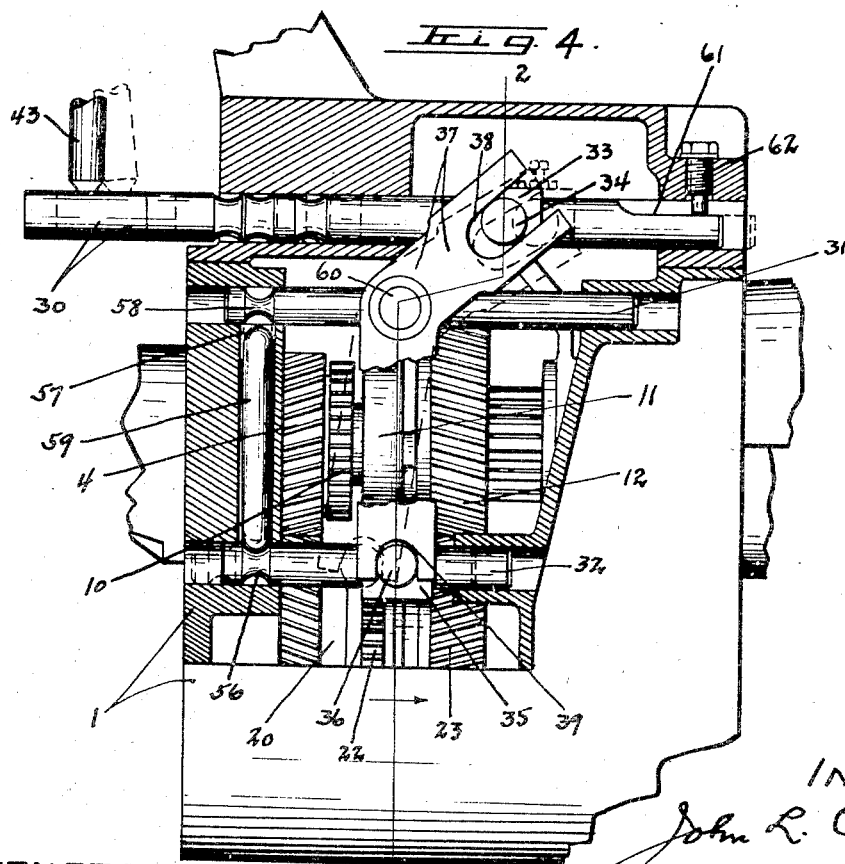

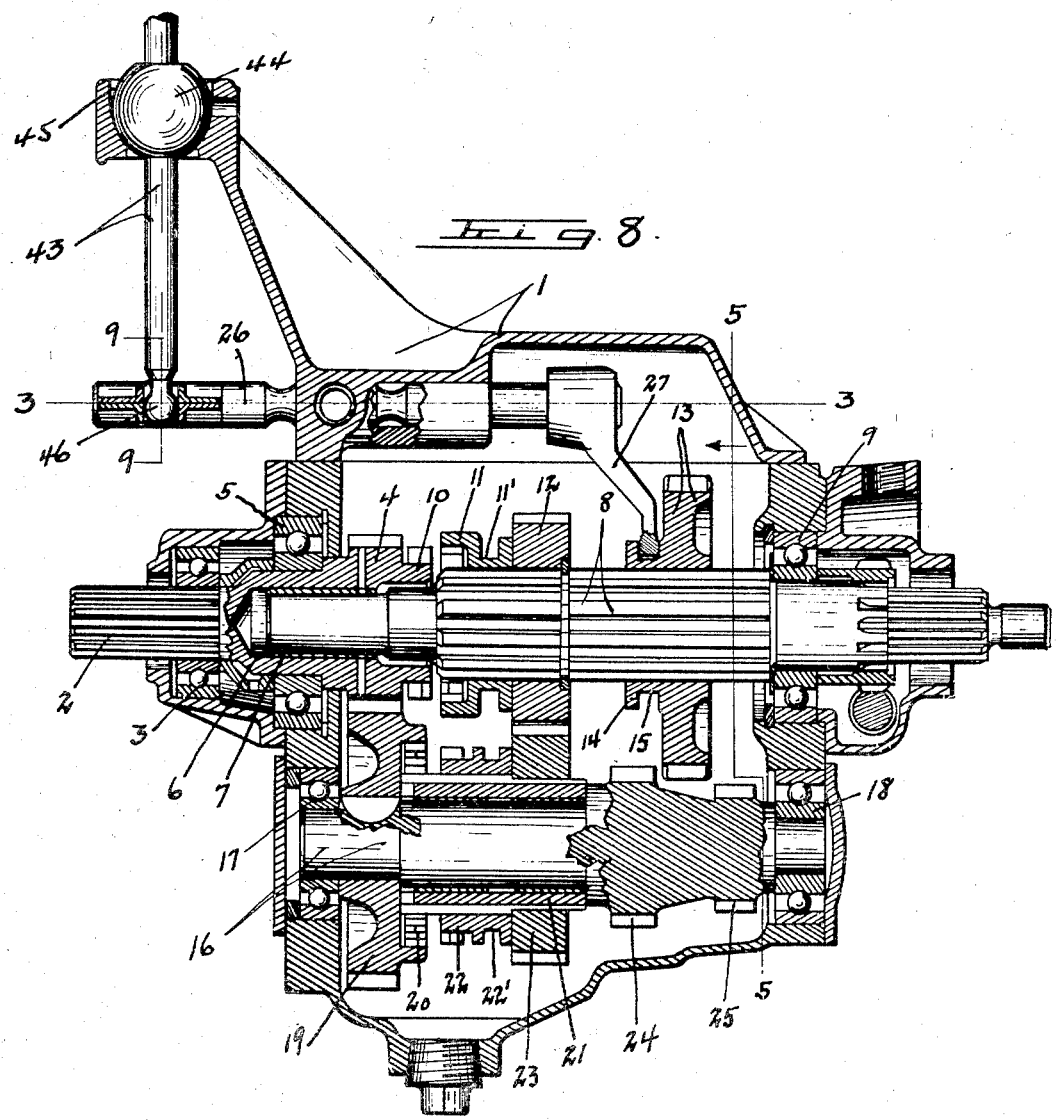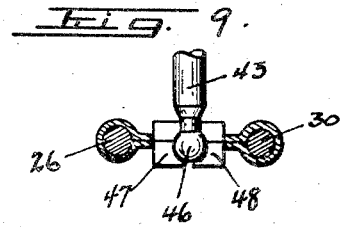

Patented May 6, 1930

1,757,414

UNITED STATES PATENT OFFICE

JOHN L. COLLINS, OF SYRACUSE, NEW YORK, ASSIGNOR TO THE WARNER CORPORATION, OF SYRACUSE, NEW YORK, A CORPORATION OF INDIANA

POWER-TRANSMISSION GEARING

Application filed June 11, 1928. Serial No. 284,441.

This invention relates to a new and improved power transmission gearing.

In power transmission gearing particularly such transmission gearing as is adapted for use with automotive vehicles it is desirable to have a structure in which the different gears can be selectively brought into the transmission train by the minimum effort and the shortest throw of the shifting lever.

It is also desirable in transmissions which are designed for this purpose to have the same confined in as small a space as possible both for ease of assembly, conservation of space and the minimizing of the weight of the vehicle.

The main object of my invention is to construct a power transmission gearing which will be positive in action in which the several gears can be brought into the transmission line with the minimum of effort and which when assembled can be confined in a comparatively small casing.

Other objects and advantages relate to the size, shape and arrangement of parts all as will more fully appear from the following description taken in connection with the accompanying drawings in which:

Figure 1 is a section on line 1—1 of Figure 3 showing the transmission gearing in the position where the power is transmitted through the second or intermediate gear.

Figure 2 is a section on line 2—2 of Figure 4.

Figure 3 is a section on line 3—3 of Figure 8.

Figure 4 is a section similar to Figure 1 showing the transmission gearing in the neutral or inoperative position.

Figure 5 is a section on line 5—5 of Figure 8.

Figure 6 is a perspective view of the male member of a clutch.

Figure 7 is a perspective view of the female member of a clutch.

Figure 8 is a section on line 8—8 of Figure 3.

Figure 9 is a section on line 9—9 of Figure 8.

It will be understood that my special design of transmission gearing and particularly the means employed for bringing into the transmission train the different gears in my transmission is adapted for use with different arrangements of transmission gearing and with different numbers of gears but for the purpose of explaining the construction and operation of my device I have here shown a transmission gearing with an arrangement of gears permitting the transmission of power directly through the transmission so that the drive shaft extending to the rear axle of the car will be turned the same number of R. P. M. as the drive shaft leading from the engine is turned. I have also shown an arrangement of gearing whereby it is possible to have either one of the two different reducing gears placed in the transmission train so that the number of R. P. M. which will be made by the drive shaft which leads to the rear axle will be reduced in number. I have also provided a gearing means whereby the direction of rotation of the drive shaft leading from the transmission of the rear axle will be a reverse direction to the direction of rotation of the drive shaft leading from the engine to the transmission.

For convenience in explaining the operation of my device I will call the arrangement of gears in which the power is transmitted directly to the drive shaft leading to the axle, the "high" gear. I will call the two arrangements of the transmission in which the number of R. P. M. transmitted to the drive shaft leading to the axle is reduced, the "intermediate" gear and the "low" gear, respectively, and I will call the arrangement of the transmission in which the direction of rotation of the drive shaft leading to the axle is reverse to that of the drive shaft leading from the engine to the transmission, "reverse" gear.

Referring to Fig. 8 my device consists of a case —1— in one end of which is journaled a shaft —2— leading to the source of power, not shown. Shaft —2— is preferably journaled in a ball bearing —3— and carries on its inner end integral therewith a gear —4—, the portion of shaft —2— adjacent gear —4— being journaled in a supplementary ball bearing —5—. The inner end of shaft —2— is provided with an aperture —6— in which is positioned a bushing —7—. Aperture —6— functions as a journal for one end of a shaft —8—, the other end of shaft —8— being journaled in a ball bearing —9— carried in case —1—. The inner end of shaft —2— is provided with a male member —10— of a clutch and the inner end of shaft —8— has slidably mounted thereon and splined thereto a female clutch member —11—. Clutch member —11— is provided on its rear face with an annular groove —11'— for a purpose hereinafter to be described. The exact construction of members 10 and 11 will be hereinafter described. A gear —12— is pinned or otherwise secured on shaft —8— adjacent clutch member —11—. Between gear —12— and ball bear —9— a gear —13— is slidably mounted on and splined to shaft —8—. Gear —13— is provided on one side with an annular flange —14— and an annular groove —15— for a purpose hereinafter to be described.

Beneath shaft —8— and in parallel relation thereto a shaft —16— is journaled in case —1— preferably in ball bearings as 17 and 18. A gear —19— is pinned or otherwise secured to shaft —16— and is in mesh with gear —4—. The inner face of gear —19— is provided with a female clutch member —20— similar in design to clutch member —11—. A collar —21— is rotatably mounted on shaft —16— adjacent gear —19—. A male clutch member —22— similar in design to clutch member 10 is slidably mounted on and splined to collar —21—. Clutch member —22— on its rear end is provided with an annular groove —22'— for a purpose hereinafter to be described. A gear —23— is pinned or otherwise secured to the inner end of collar —21— and is positioned in mesh with gear —12—. A gear —24— is pinned or otherwise secured to shaft —16— adjacent the inner end of collar —21— and is positioned so that gear —13— may be placed in mesh with it by sliding gear —13— on shaft —8—. A second gear —25— is pinned or otherwise secured on the end of shaft —16— adjacent ball bearing —18—.

In the upper part of case —1— there is slidably mounted a shaft —26— carrying on its inner end a downwardly extending arm —27—, the lower end of arm —27— being positioned in groove —15— on gear —13— so that the movement of shaft —26— in and out of case —1— will move gear —13— longitudinally on shaft —8—. Referring to Figure 5 there is journaled in case —1— in offset parallel relation to shaft —16— a stud shaft —28— carrying an idler gear —29— in mesh with gear —25—. Gear —29— is so positioned that gear —13— may be placed in mesh with it by sliding gear —13— on shaft —8—.

Referring to Figure 3 in the upper part of case —1— a shaft —30— is slidably mounted in parallel relation with shaft —26—. Referring to Figure 4 a shaft —31— is slidably mounted in case —1— beneath shaft —30— and in parallel relation thereto, and another shaft —32— is slidably mounted in case —1— beneath shaft —31— and in parallel relation thereto.

Shaft —30— is provided with a collar —33— having a laterally extending circular boss —34—. Shaft —32— is provided with a shifting finger —35— having a laterally extending boss —36—. An angular crank —37— is pivotally mounted on shaft —31— and is provided on its upper end with a jaw —38— in which is positioned boss —34— for sliding movement therein. The lower end of crank —37— is provided with a jaw —39— in which is positioned boss —36— for sliding movement therein.

Referring to Figure 2 shifting finger —35— is secured to shaft —32— by means of set screw —40— and has its lower end positioned in annular groove —22'— of clutch member —22—. Another shifting finger —41— is secured to shaft —31— by pin —42— and has its lower end positioned in annular groove —11'— of clutch member —11—.

Referring to Figure 8 the shifting lever —43— is movably mounted in case —1— by a ball and socket joint comprising a ball —44— on lever —43— and a socket —45— in case —1—. The lower end of lever —43— is provided with a ball —46— which is normally positioned, as perhaps may best be seen from Figure 3, between fork —47— carried by shaft —26— and fork —48— carried by shaft —30— so that ball —46— may be placed in either fork —47— or fork —48— as desired and lever —43— may then be pivoted in socket —45— to move longitudinally either shaft —26— or shaft —30— depending upon whether ball —46— is in registration with fork —47— or with fork —48—.

For the purpose of releasably securing shafts —26— and —30— in the position in which they may be placed I provide in shaft —26— a plurality, in this case shown as three, of annular grooves —49— and a plurality, in this case shown as three, of similar annular grooves —50— in shaft —30—. An aperture —51— is provided in case —1— with its ends in registration with shafts —26— and —30—. A ball —52— is positioned in aperture —51— adjacent shaft —30— and a ball 53 is positioned in aperture —51— adjacent shaft —26—. A spiral spring —54— is positioned in aperture —51— between balls —52— and —53— to yieldingly hold them against shafts —30— and —26— respectively. Ball —51— is provided with a finger —55— which limits the inward movement of balls —52— and —53— inasmuch as finger —55— will contact with ball —52— after a predetermined movement of either ball —52— or ball —53— into aperture —51—.

When shaft —26— has been placed in a selected position so that the transmission will function as desired ball —53— will be in one of the apertures —49— to yieldingly hold shaft —26— in the selected position. Similarly ball —52— will coact with one of slots —50— to yieldingly hold shaft —30— at a selected position.

In Figure 6 is shown a perspective view of gear —4— with clutch member 10 affixed on one face thereof and in Figure 7 is shown a perspective view of clutch member —11—. Clutch member 10 has external teeth of a size and shape to mesh with the internal teeth carried by clutch member 11 but in order that the teeth of these two clutch members may be brought into mesh more easily the outer halves of certain of the teeth are removed with the result that each clutch member carries a plurality, in this case shown as five, of full teeth with two half teeth between each pair of full teeth. With this construction the full teeth on clutch member 10 have an opening for initial engagement three times as long as would be the case if all the teeth were full teeth with the result that the two clutch members can be easily and quickly brought into mesh with each other.

The teeth on the clutch members 20 and 22 are similarly constructed.

When the transmission is in the "neutral" position so that no rotary movement is transmitted from shaft 2 to shaft 8 the parts are in the position shown in full lines in Figure 4 with clutch member 11 abutting against gear 12 and clutch member 22 abutting against gear 23. In this position, as perhaps may best be seen from Figure 8, the rotary motion of shaft 2 is transmitted through gear 4 and gear 19 to shaft 16 which results in the rotation of gears 24 and 25 but shaft 8 remains unaffected.

When it is desired to place the transmission in "high" gear so that the rotary motion will be transmitted directly from shaft 2 to shaft 8 lever 43, as perhaps may best be seen from Figure 3, is moved to place ball 46 in fork 48 and shaft 30 is then drawn outwardly until the parts are in the position shown in dotted lines in Figure 1. This movement is accomplished due to the fact that when shaft 30 is drawn outwardly boss —34— will thrust against the upper arm of crank —37—. Shaft —32— being held against inward movement by the abutting of clutch member 22 against gear 23 boss 36 on shaft 32 will be held stationary and crank 37 will pivot around boss 36 thereby causing shaft 31 to be carried outwardly and this outward movement of shaft 31 will carry outwardly shifting finger 41 which in turn will cause the outward movement of clutch member 11 which will be brought into registration with clutch member 10.

When the parts are in this position, as perhaps may best be seen from Figure 3, the rotary motion of shaft 2 will be transmitted to clutch member 10 and clutch member 11 to shaft 8 inasmuch as clutch member 11 is splined to shaft 8.

Shaft —32— is provided with an annular groove —56— which, when the parts are in the "neutral" position shown in full lines in Figure 4, will register with an aperture —57—, the opposite end of the aperture —57— registering with an annular groove —58— in shaft —31—. A locking pin —59— is positioned in aperture —57— and is of such a length that when one end is in annular groove —56— the other end will be in registration with the opposite end of aperture —57— so that it will permit the passage by aperture —57— of shaft —31—. When, however, shaft —31— has been moved outwardly so that annular groove —58— has passed beyond the end of aperture —57— locking pin —59— cannot move upwardly and its lower end being in annular groove —56— shaft —32— is locked against movement.

Shaft —30— is moved inwardly by means of lever —43— causing boss —34— to bear against crank —37— and cause the same to pivot about boss —36— thereby causing shaft —31— to move inwardly until clutch member 11 abuts against gear —12—. Shaft —30— is then moved an additional distance inward causing boss —34— to bear against crank —37—. Shaft —31— being held against further inward movement because of the abutting of clutch member 11 against gear 12 the pivot —60— carried on shaft —31— upon which crank —37— is pivoted will be held stationary for the inward movement of the upper part of crank —37— will cause the same to pivot about the pivot —60— which will result in the forward movement of the bottom part of crank —37— which will thrust against boss 36 on shaft —32— and carry shaft —32— outwardly until clutch member —22— is in registration with clutch member —20—. By this operation pin —59— will have been moved upwardly into registration with annular groove —58— to lock shaft —31— in position. When the transmission is in the "intermediate" position just described the transmission of power, as perhaps may best be seen from Figure 8, will be as follows: The rotary motion of shaft —2— will be transmitted through gear —4— and gear —19— through clutch members —20— and —22— to collar —21—, gear —23— and gear —12— and thence to shaft —8—.

When it is desired to place the transmission in the "low" position the parts are returned to the neutral position in the manner heretofore described. Ball —46— of lever —43— is then placed in fork —47— and shaft —26— is then moved outwardly. As perhaps may best be seen from Figure 8 the outward movement of shaft —26— will carry shifting finger —27— outwardly which in turn will move gear 13 longitudinally of shaft —8— and into mesh with gear —24—. In this "low" position the transmission of power will be as follows: The rotary motion of shaft 2 will be transmitted through gear 4, gear 19, shaft 16, gear 24 and gear 13 to shaft 8.

When it is desired to place the transmission in the "reverse" position shaft —26— is moved inwardly by means of lever —43— to and beyond the neutral position shown in Figure 3 which further inward movement will cause shifting finger —27— to move gear 13 longitudinally of shaft 18 and into mesh with idler gear 29 shown on Figure 5. In this position the transmission of power, as perhaps may best be seen from Figures 5 and 8 will be as follows: The rotary motion of shaft 2 will be transmitted through gear 4, gear 19, shaft 16, gear 25, idler gear 29 and gear 13 to shaft 8 but inasmuch as an idler gear 29 is interposed between gear 25 and gear 13 the direction of rotation of shaft 8 will be in a direction reverse to the direction of shaft 2.

For the purpose of preventing any rotary motion of shaft 30 during its movement in and out of case —1— which would result in misadjustment of the parts I provide a flattened end —61— on the inner end of shaft —30— and I also provide in case —1— a guide screw —62— which is in registration with the flat end —61— of shaft —30— and acts as an upper bearing therefor while preventing any rotary motion of shaft —30—.

It will be understood that the size of gears 4, 19, 24, 25 and 13 in relation to each other may be varied as desired so that the R. P. M. of shaft 8 in relation to the R. P. M. of shaft 2 may be in such proportion in the "intermediate" and "low" positions of the transmission as may be desired.

It will also be understood that the source of power from which rotary motion is transmitted to shaft 2 may be of different kind, and it will also be understood that the rotary motion from shaft 8 may be transmitted to different types of apparatus as desired, for although I have shown and described a specific structure and form of part as an exemplification of an embodiment of my invention I do not desire to restrict myself to the exact size, shape or relation of parts as various changes may be made within the scope of the appended claims.

What I claim is:

1. A gearing comprising a reciprocably actuating shaft, a pair of clutch members, an additional pair of shafts for actuating respective clutch members, a crank having a pivotal mounting with respect to each of the last named shafts, means in connection with the actuating shaft for rocking said crank in opposite directions as said actuating shaft is reciprocated, means for causing said crank to rock about both of said pivots when the actuating shaft moves in one direction and to rock about both of said pivots when the actuating shaft moves in the opposite direction, and means for holding alternate ones of said clutch actuating shafts stationary as the crank is rocked in opposite directions.

2. A gearing comprising an actuating shaft, a pair of movable clutch operating shafts, a single crank having pivots stationary with each clutch shaft, said crank being rocked in opposite directions by movement of the actuating shaft, means preventing movement of one of said clutch shafts when the crank is rocked in one direction whereby the crank will rock about the stationary pivot on said shaft to reciprocate the other clutch shaft, and means for holding the other clutch shaft stationary when the crank is rocked in the opposite direction whereby the crank will rock about the stationary pivot on said other clutch shaft to reciprocate the first-named clutch shaft.

3. A gearing comprising an actuating shaft, a pair of clutch operating shafts, clutches operated by said shafts, a single crank having a pivot stationary with each clutch shaft, means for holding one of said clutch shafts stationary when the crank is rocked in one direction to thereby reciprocate the other clutch shaft, and means for holding the other clutch shaft stationary when the crank is rocked in the other direction to thereby reciprocate the first named clutch shaft.

4. A gearing comprising an actuating shaft, a pair of clutch operating shafts, a crank having a pivot stationary with each clutch operating shaft, means for rocking the crank in opposite directions, means for maintaining one of said clutch operating shafts stationary when the crank is rocked in one direction about both of said pivots to reciprocate the other clutch operating shaft, and means for maintaining the other clutch operating shaft stationary when the crank is rocked in the opposite direction about both of said pivots to reciprocate the first named clutch operating shaft.

5. A gearing comprising an actuating shaft, a pair of clutch elements, a pair of clutch operating shafts, a single crank having a pivot stationary with each clutch operating shaft, said crank being rocked in opposite directions by movement of the actuating shaft, means preventing movement of one of said clutch elements when the crank is rocked in one direction, and means for holding the other clutch element stationary when the crank is rocked in the opposite direction.

6. A gearing comprising a reciprocably actuating shaft, a pair of clutch members, an additional pair of clutch operating shafts, a single crank pivotally connected to the actuating shaft and to the clutch operating shafts, means for reciprocating the actuating shaft, means in connection with the actuating shaft to rock the crank about the pivots on the clutch operating shafts, means maintaining alternate clutch operating shafts in a stationary position when the crank is rocked in one direction, and additional means for maintaining such stationary shaft in a stationary position during the initial rocking of the crank in the opposite direction.

In witness whereof I have hereunto set my hand this 1st day of June 1928.

JOHN L. COLLINS.